US012782187B2

(12) United States Patent
Ishii et al.

(10) Patent No.: US 12,782,187 B2
(45) Date of Patent: Nov. 3, 2026

(54) CAPACITIVE LIQUID SENSOR AND METHOD FOR INSTALLING CAPACITIVE LIQUID SENSOR

(71) Applicant: UBUKATA INDUSTRIES CO., LTD., Nagoya (JP)

(72) Inventors: Shigehisa Ishii, Nagoya (JP); Yoshio Yamaguchi, Nagoya (JP)

(73) Assignee: UBUKATA INDUSTRIES CO., LTD., Nagoya (JP)

( * ) Notice: Subject to any disclaimer, the term of this patent is extended or adjusted under 35 U.S.C. 154(b) by 0 days.

(21) Appl. No.: 19/141,703

(22) PCT Filed: Dec. 23, 2022

(86) PCT No.: PCT/JP2022/047693

§ 371 (c)(1),
(2) Date: Jun. 20, 2025

(87) PCT Pub. No.: WO2024/134888

PCT Pub. Date: Jun. 27, 2024

(65) Prior Publication Data

US 2026/0118152 A1 Apr. 30, 2026

(51) Int. Cl.
*G01F 23/263* (2022.01)

(52) U.S. Cl.
CPC .......... *G01F 23/268* (2013.01); *G01F 23/265* (2013.01)

(58) Field of Classification Search
CPC ..... G01F 23/263; G01F 23/265; G01F 23/268
See application file for complete search history.

(56) References Cited

U.S. PATENT DOCUMENTS

2014/0352429 A1* 12/2014 Murata .................. G01F 23/26
73/304 C
2015/0168200 A1 6/2015 Lee et al.

FOREIGN PATENT DOCUMENTS

CN 103906999 A 7/2014
CN 111328296 A 6/2020
JP H0630761 U 4/1994
JP H0630762 * 4/1994

(Continued)

OTHER PUBLICATIONS

JP-2581797-Y2 Machine Translation (Year: 1998).*

(Continued)

*Primary Examiner* — Nathan Milakovich
(74) *Attorney, Agent, or Firm* — KARCESKI IP LAW, PLLC

(57) ABSTRACT

A capacitive liquid sensor includes a first frame and a second frame each and a plurality of first electrode plates and second electrode plates. The first frame and the second frame include through-portions through which the first electrode plate and the second electrode plate are passed. The first electrode plates and the second electrode plates each include a detection portion and two fixing. In the first electrode plate, the fixing portion of the first electrode plate is fixed to the first frame so that the detection portion of the first electrode plate is passed through the through-portions of the first frame and the second frame. In the second electrode plate, the fixing portion of the second electrode plate is fixed to the second frame so that the detection portion of the second electrode plate is passed through the through-portions of the second frame and the first frame.

6 Claims, 6 Drawing Sheets

(56) References Cited

FOREIGN PATENT DOCUMENTS

| | | | |
|---|---|---|---|
| JP | H0630762 | U | 4/1994 |
| JP | H0996618 | A | 4/1997 |
| JP | 2581797 | Y2 * | 9/1998 |
| JP | 2013092491 | A | 5/2013 |
| JP | 2016090300 | A | 5/2016 |
| WO | 2021225617 | A1 | 11/2021 |

OTHER PUBLICATIONS

JP H0630762 Machine Translation (Year: 1994).*
Chinese Office Action dated Sep. 21, 2025, for Chinese Patent Application No. 2022801027150.
Korean Office Action dated Aug. 5, 2025, for Korean Patent Application No. 10-2025-7017925.
International Search Report dated Feb. 7, 2023, for International Patent Application No. PCT/JP2022/047693.

* cited by examiner

CAPACITIVE LIQUID SENSOR AND METHOD FOR INSTALLING CAPACITIVE LIQUID SENSOR

CROSS-REFERENCE TO RELATED APPLICATION(S)

This is a National Stage Entry into the United States Patent and Trademark Office from International Patent Application No. PCT/JP2022/047693, filed on Dec. 23, 2022, the entire contents of which are incorporated herein by reference.

FIELD OF THE INVENTION

Embodiments of the present invention relate to a capacitive liquid sensor and a method for installing the capacitive liquid sensor.

BACKGROUND OF THE INVENTION

Conventionally, a capacitive liquid sensor has been proposed as a means for detecting a non-conductive liquid, such as lubricating oil. The capacitive liquid sensor detects the presence or absence of liquid, the amount of liquid, and the mixing ratio of liquids by utilizing the fact that when a non-conductive liquid enters between electrodes fixed across a space, the capacitance between the electrodes changes. For example, there is a type of capacitive liquid sensor in which electrode plates are fixed to each of two conductive pins of an airtight terminal to detect a change in the liquid surface height in a container from a change in the capacitance between the electrode plates. Such a liquid sensor is installed in a position where, for example, the entire electrode is located in the liquid during normal operation, and when the liquid surface drops, the electrode is exposed to the gas. The liquid sensor detects a change in the liquid surface based on the difference in dielectric constant between the liquid and the gas.

However, in the conventional capacitive liquid sensor, there is only a slight capacitance change obtained from the presence or absence of liquid between the electrodes, and it has been difficult to accurately determine the state of the liquid from the capacitance change. In this case, it is possible to increase a capacitance change caused by a change in the state of the liquid by increasing the area of the electrodes or reducing the interval between the electrodes. Therefore, a technique to obtain a large capacitance by laminating a plurality of electrodes at narrow intervals is considered.

SUMMARY OF THE INVENTION

However, when a plurality of electrodes are arranged at narrow intervals, if the support for each electrode is weak, the positional relationship between the electrodes changes easily when each electrode is subjected to an external force, which adversely affects the detection characteristics of the liquid sensor. Further, if the distance between the electrodes is narrowed, when each electrode is exposed from the liquid to the gas, it becomes difficult for droplets and bubbles that have entered between the electrodes to be discharged from between the electrodes due to the effect of surface tension and the like. This causes a problem in that, even if a gas-liquid state around the electrodes changes, the liquid sensor cannot immediately respond to the change.

The present embodiment has been made in consideration of the circumstances described above, and an object of the present embodiment is to provide a capacitive liquid sensor that is provided with a plurality of electrodes and is capable of detecting a change in the state of a liquid with high sensitivity by improving the support strength of the electrodes and the discharge property of droplets and bubbles between the electrodes.

A capacitive liquid sensor according to an embodiment includes: a base member; a first conductive terminal pin and a second conductive terminal pin that are passed through the base member, are fixed to the base member via a filler having electrical insulation, and are electrically insulated from each other; a first frame that is made of a metallic material and electrically connected to the first conductive terminal pin; a second frame that is made of a metallic material and electrically connected to the second conductive terminal pin; a plurality of first electrode plates that are each made of a metal plate and are connected and fixed to the first frame; and a plurality of second electrode plates that are each made of a metal plate and are connected and fixed to the second frame. The first frame and the second frame include through-portions, respectively, through which the first electrode plate and the second electrode plate are passed, and are arranged to face each other. The first electrode plates and the second electrode plates each include a detection portion and two fixing portions extending from both edges of the detection portion, are each formed in a cross shape in which the longitudinal direction of the detection portion intersects the protruding direction of the fixing portions, and are arranged alternately to face each other. In the first electrode plate, the fixing portion of the first electrode plate is fixed to the first frame in a state where the detection portion of the first electrode plate is passed through the through-portions of the first frame and the second frame. In the second electrode plate, the fixing portion of the second electrode plate is fixed to the second frame in a state where the detection portion of the second electrode plate is passed through the through-portions of the second frame and the first frame.

A method for installing the capacitive liquid sensor according to the embodiment includes a step of installing the capacitive liquid sensor in the installation target in an orientation in which a surface direction of each of the first frame and the second frame is a vertical direction and a surface direction of each of the first electrode plates and the second electrode plates is the vertical direction.

DESCRIPTION OF EMBODIMENT(S) OF THE INVENTION

Hereinafter, a capacitive liquid sensor according to one embodiment and a method for installing the capacitive liquid sensor will be described with reference to the drawings. In the following description, a capacitive liquid sensor may be simply referred to as a liquid sensor.

Figure 1:
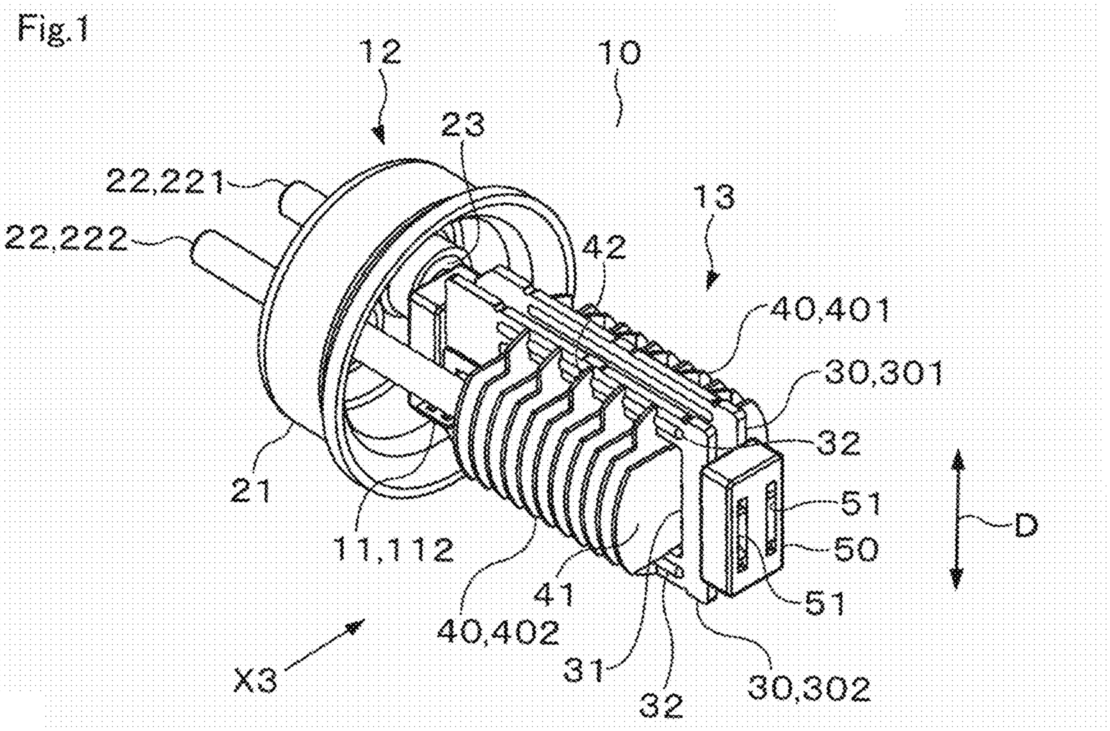
FIG. 1 is a perspective view showing an external appearance of an example of a capacitive liquid sensor according to one embodiment.

A liquid sensor 10 shown in FIG. 1 is installed in a container, such as a compressor container, filled with an electrically insulating liquid. The liquid sensor 10 is used for detecting the state of the electrically insulating liquid present in the container, that is, for detecting the liquid surface heights and the mixing ratio of lubricating oil and liquid refrigerant in the container. As shown in FIGS. 1 to 4, the liquid sensor 10 includes two connecting members 11, a base member 21, two conductive terminal pins 22, a filler 23, two frames 30, a plurality of electrode plates 40, and two spacers 50.

The base member 21, the conductive terminal pins 22, and the filler 23 constitute an airtight terminal 12. The airtight terminal 12 is a component for installing the liquid sensor 10 in the container or the like of the compressor. The frames 30, the electrode plates 40, and the spacers 50 constitute a detection unit 13. The detection unit 13 is a component for detecting the state of electrically insulating liquids such as lubricating oil and liquid refrigerant of the compressor. The connecting member 11 is a component for electrically and physically connecting the conductive terminal pins 22 and the frame 30.

In the case of the present embodiment, the two connecting members 11 have different specific structures. Of the two connecting members 11, one connecting member 111 has a structure that is thicker and more rigid, that is, more difficult to deform, compared to the other connecting member 112. In other words, the other connecting member 112 has a structure that is thinner and more elastic, that is, easier to deform, compared to the one connecting member 111.

In the following description, the more rigid one of the two connecting members 111, 112 may be referred to as a first connecting member 111, and the more easily deformable one may be referred to as a second connecting member 112. Note that in the present specification, the terms first and second are used for convenience to distinguish components having common functions, and do not indicate the order or superiority of the components.

Figure 5:
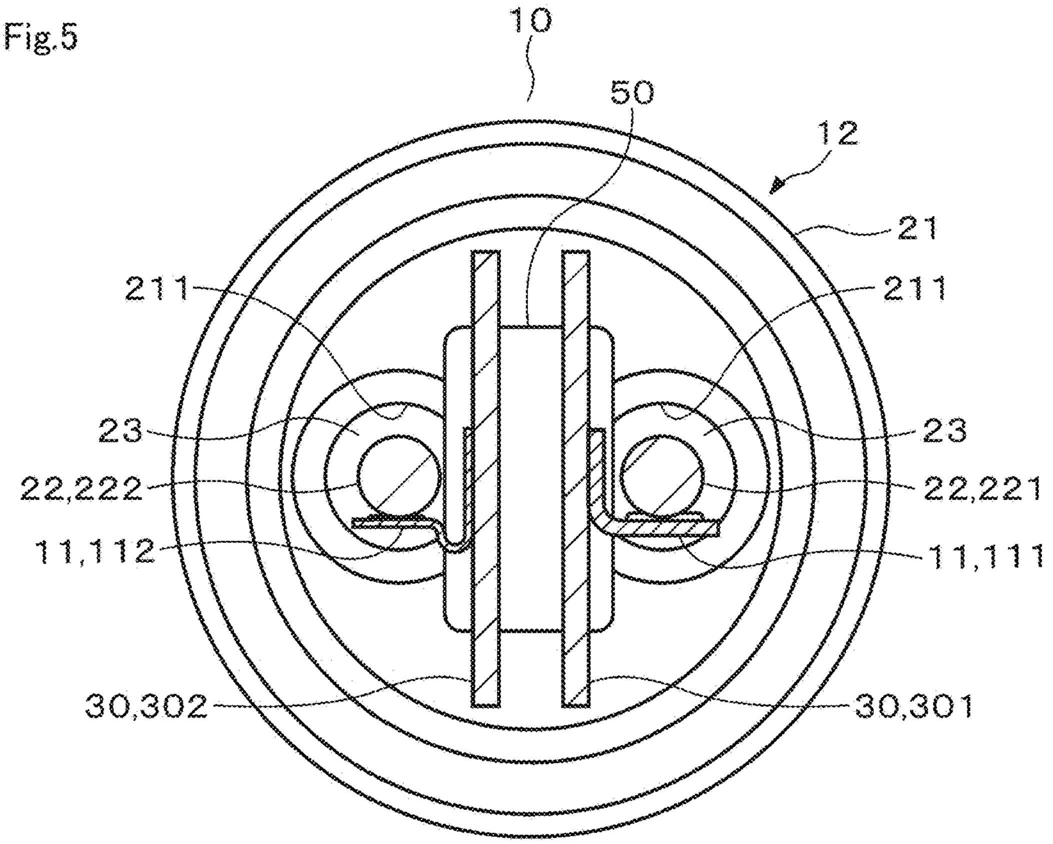
FIG. 5 is a cross-sectional view showing an example of the capacitive liquid sensor according to one embodiment, taken along line X5-X5 in FIG. 3.

As shown in FIG. 5, the second connecting member 112 can have a structure that is easier to elastically deform by, for example, increasing the total length through a large bypass around an L-shaped bent portion. Therefore, a first frame 301 can be firmly fixed by the first connecting member 111 with higher rigidity, and the second connecting member 112 with higher elasticity can elastically absorb distortions and dimensional changes that occur during welding or the like. As a result, deformation of the frame 30 and the electrode plate 40 due to assembly errors, stress during handling, and the like can be suppressed, and variations in the characteristics of the liquid sensor 10 can be reduced.

Figure 4:
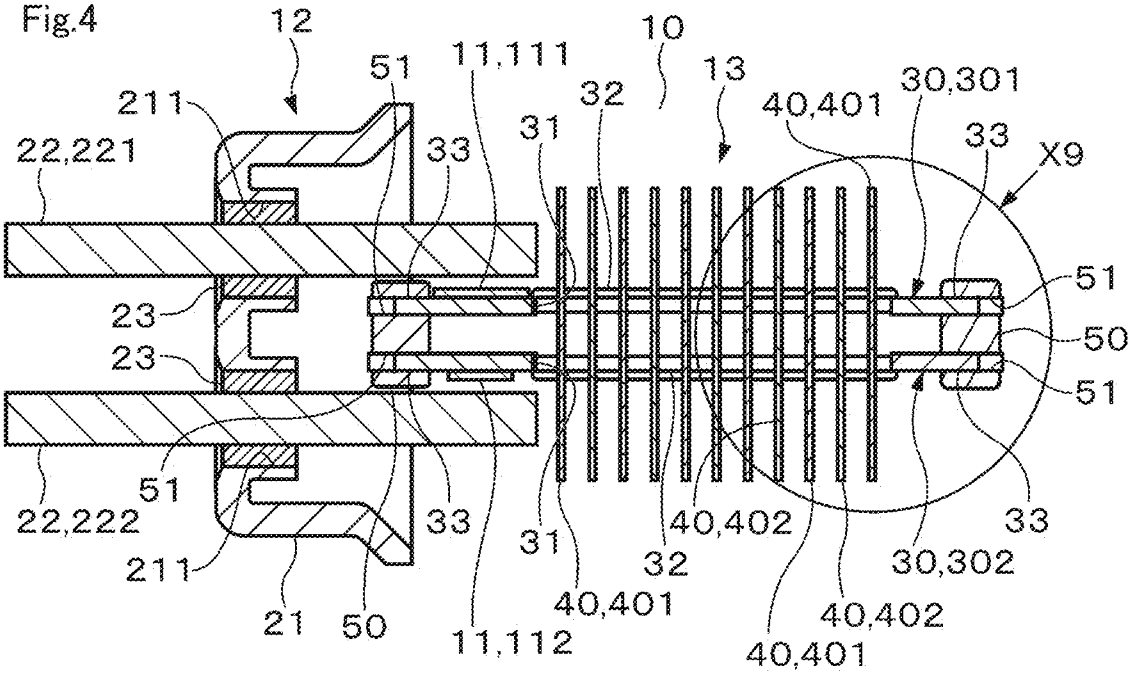
FIG. 4 is a cross-sectional view showing an example of the capacitive liquid sensor according to one embodiment, taken along line X4-X4 in FIG. 3.

The base member 21 is made of a metallic material and formed in the shape of a shallow cup. The conductive terminal pin 22 is made of a conductive member such as metal and is formed in the shape of a cylindrical rod, for example. As shown in FIG. 4, the two conductive terminal pins 22 are respectively passed through holes 211 formed in the bottom of the base member 21. The filler 23 is made of an electrically insulating material such as glass and can be referred to as an insulating member. The filler 23 fills the space between the inside of the hole 211 and the conductive terminal pin 22, electrically insulates the conductive terminal pin 22 and the base member 21, and fixes the conductive terminal pin 22 to the base member 21. Thus, the two conductive terminal pins 22 are each fixed to the base member 21 in a state of being electrically insulated from the base member 21 and being airtight and watertight.

The two conductive terminal pins 22 are electrically insulated from each other. The two conductive terminal pins 22 are arranged in parallel and extend in the depth direction of the base member 21. The detection unit 13 is connected to one end side of each of the two conductive terminal pins 22. The detection unit 13 is located on the interior side of the container when the liquid sensor 10 is installed in the container or the like of the compressor. The other end side of each of the two conductive terminal pins 22 is located on the exterior side of the container when the liquid sensor 10 is installed in the container or the like of the compressor. In the following description, when the two conductive terminal pins 22 are distinguished, one may be referred to as a first conductive terminal pin 221 and the other may be referred to as a second conductive terminal pin 222.

The frame 30 is made of a conductive metallic material and is electrically connected to the conductive terminal pin 22. In the following description, when the two frames 30 are distinguished, the one connected to the first conductive terminal pin 221 may be referred to as a first frame 301 and the one connected to the second conductive terminal pin 222 may be referred to as a second frame 302. The first frame 301 and the second frame 302 are formed in the same shape. The frame 30 is formed in the shape of a rectangular frame, with a rectangular hole formed in the center of a rectangular metal plate as a whole. The frame 30 is long in the longitudinal direction of the conductive terminal pin 22 and is formed in the shape of a substantially rectangular frame as a whole. The two frames 30 are arranged to face each other at a predetermined distance. In this case, the surface direction of the frame 30 coincides with the longitudinal direction of the conductive terminal pin 22.

As shown in FIGS. 2, 3, 6, and 7, the frame 30 includes a through-portion 31, a protruding portion 32, and a defining portion 33. The through-portion 31 is formed in the shape of a rectangular hole and has a function of passing a part of the plurality of electrode plates 40. The protruding portions 32 are provided on both edges of the frame 30 extending in the longitudinal direction, that is, on both long sides, and are each formed in a shape protruding toward the opposite side of the opposing frame 30. The protruding portion 32 is long and continuous in the longitudinal direction of the frame 30.

The length dimension of the protruding portion 32 is set equal to or larger than the length dimension of the through-portion 31 in the longitudinal direction.

Figure 2:
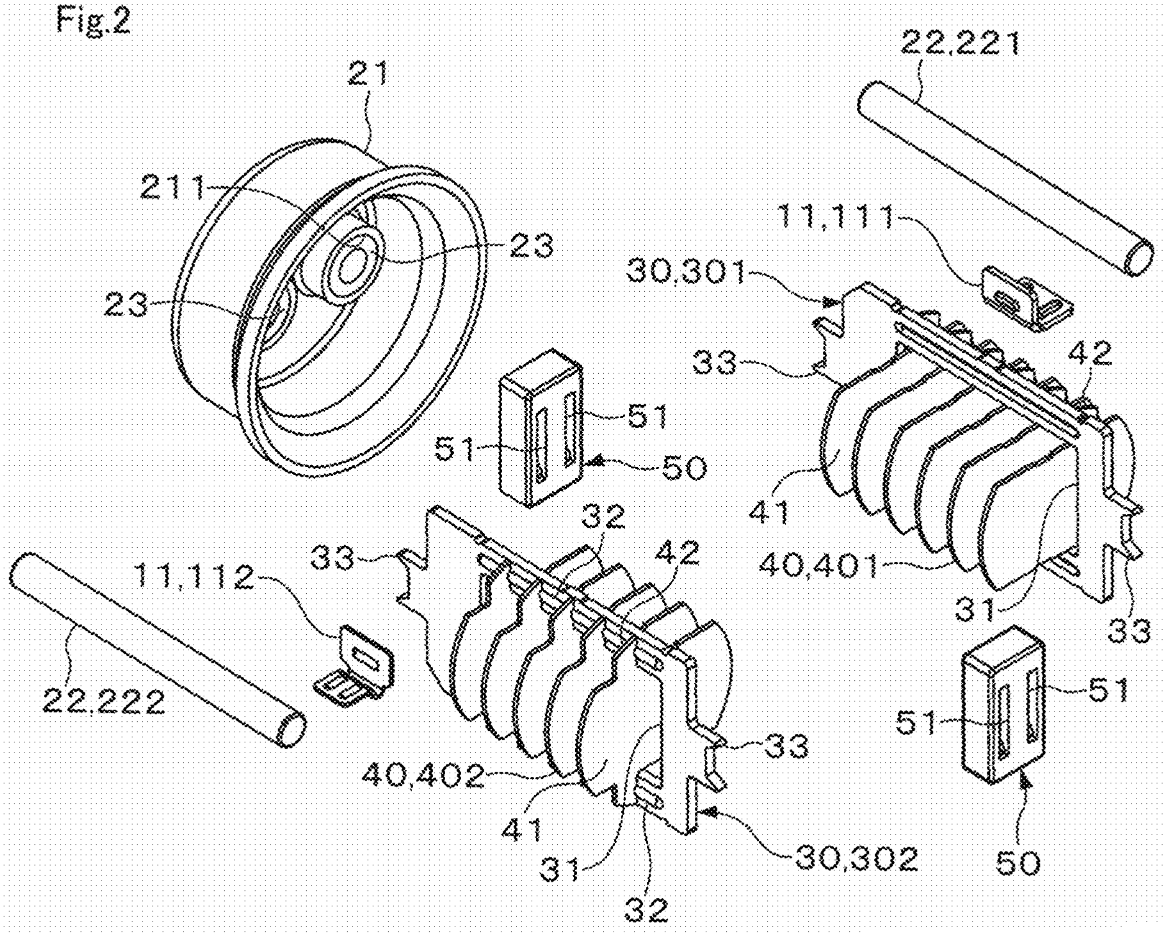
FIG. 2 is a perspective view showing disassembled components of an example of the capacitive liquid sensor according to one embodiment.
Figure 3:
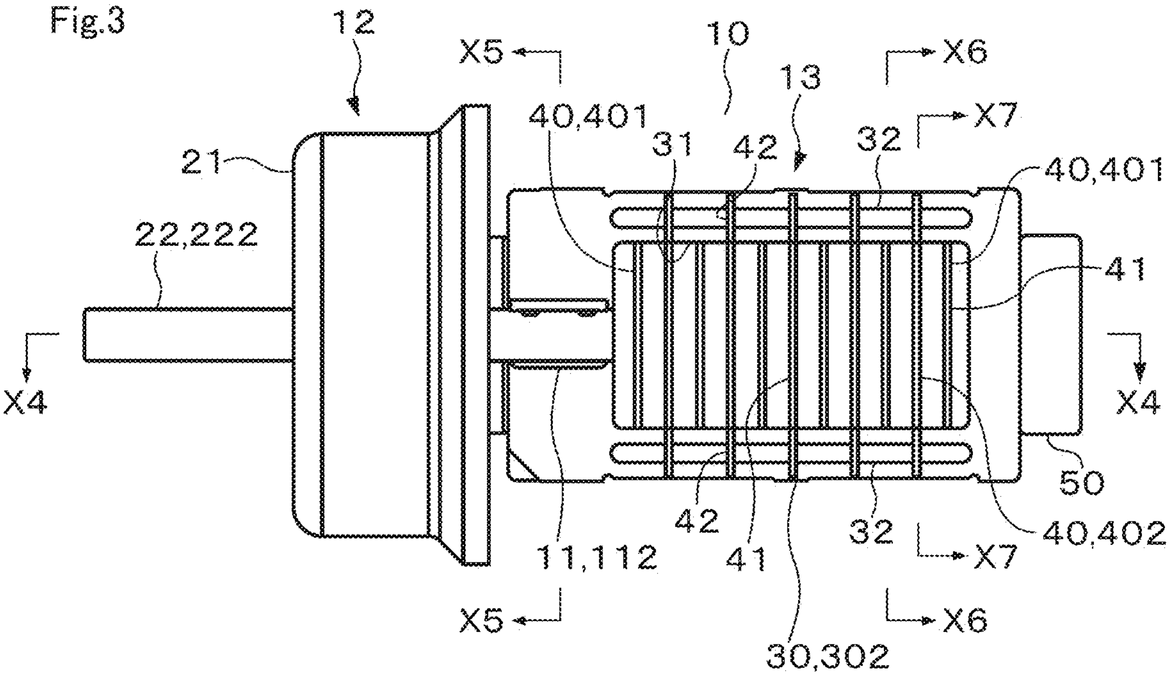
FIG. 3 is a view showing an example of the capacitive liquid sensor according to one embodiment, as viewed from direction X3 in FIG. 1.

As shown in FIG. 2 and other figures, the defining portions 33 are provided on both sides of the frame 30 extending in the width direction, that is, on both short sides, and each protrude outward on both longitudinal sides of the frame 30. In the present specification, when a width direction is referred to for a certain component, the width direction means a direction perpendicular to the longitudinal direction of the component. The defining portion 33 is inserted into the spacer 50 and has a function of defining a distance from the opposing frame 30, that is, maintaining a constant distance from the opposing frame 30. The frame 30 is integrally formed with the through-portion 31, the protruding portion 32, and the defining portion 33 by, for example, pressing a metal plate.

The spacer 50 is configured in a rectangular block or container shape and includes two insertion portions 51. The two insertion portions 51 are formed of, for example, elongated rectangular holes or long-hole-shaped holes extending in the width direction of the frame 30, and are arranged in parallel with each other. The defining portion 33 of the frame 30 is inserted and held in the insertion portion 51. Thus, the positional relationship between the two frames 30 is defined. The spacer 50 is preferably made of an electrically insulating material, such as resin or ceramic, that does not change in shape or alter in the operating environment of the liquid sensor 10. In the present embodiment, a total of two spacers 50 are provided, with one at each end of the frame 30. However, as long as the positional relationship between the two frames 30 can be defined, the spacer 50 may be provided only at one end side of the frame 30. The spacer 50 may be provided in the defining portion 33 by insert molding.

The frame 30 is electrically and physically connected to the conductive terminal pin 22 via a connecting member 11. The connecting member 11 is formed of, for example, a member having a substantially L-shaped cross section, which is obtained by bending a metal plate. One end of the connecting member 11 is fixed to the frame 30 by, for example, welding or brazing, and the other end is connected to the conductive terminal pin 22 by, for example, welding or brazing.

The electrode plate 40 is made of a thin conductive plate material, such as a metal plate, and is provided on the frame 30 and electrically connected to the conductive terminal pin 22 via the frame 30 and the connecting member 11. In the following description, the electrode plate 40 provided on the first frame 301 may be referred to as a first electrode plate 401, and the electrode plate 40 provided on the second frame 302 may be referred to as a second electrode plate 402. The first electrode plates 401 and the second electrode plates 402 face each other without contacting each other and are arranged alternately in the longitudinal direction of the frame 30, that is, in the longitudinal direction of the conductive terminal pin 22. In other words, the surfaces of the respective electrode plates 40 are arranged orthogonally to the extending direction of the conductive terminal pin 22.

Figure 6:
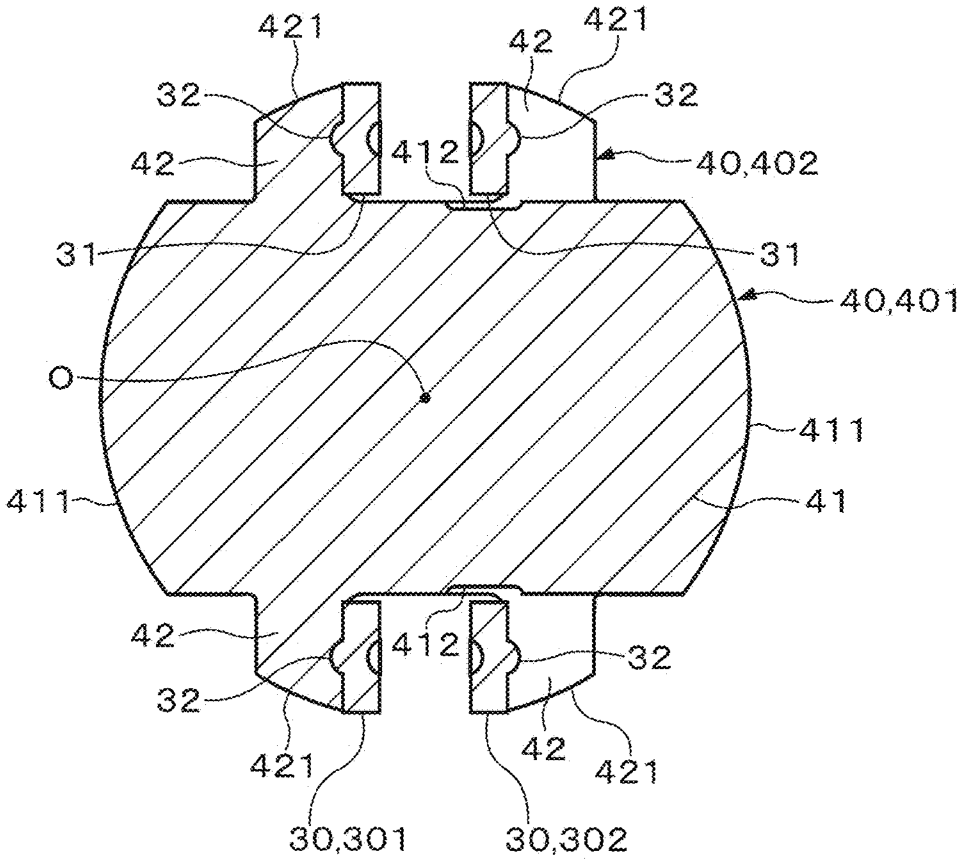
FIG. 6 is a cross-sectional view showing an example of the capacitive liquid sensor according to one embodiment, taken along line X6-X6 in FIG. 3.
Figure 7:
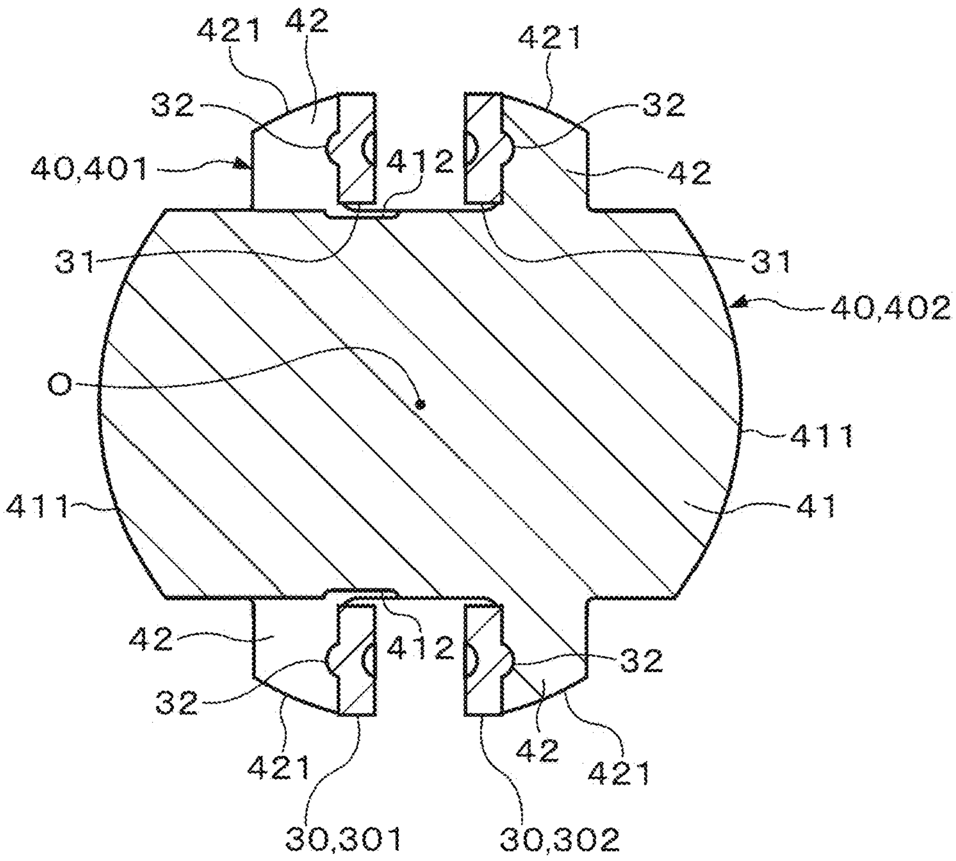
FIG. 7 is a cross-sectional view showing an example of the capacitive liquid sensor according to one embodiment, taken along line X7-X7 in FIG. 3.
Figure 8:
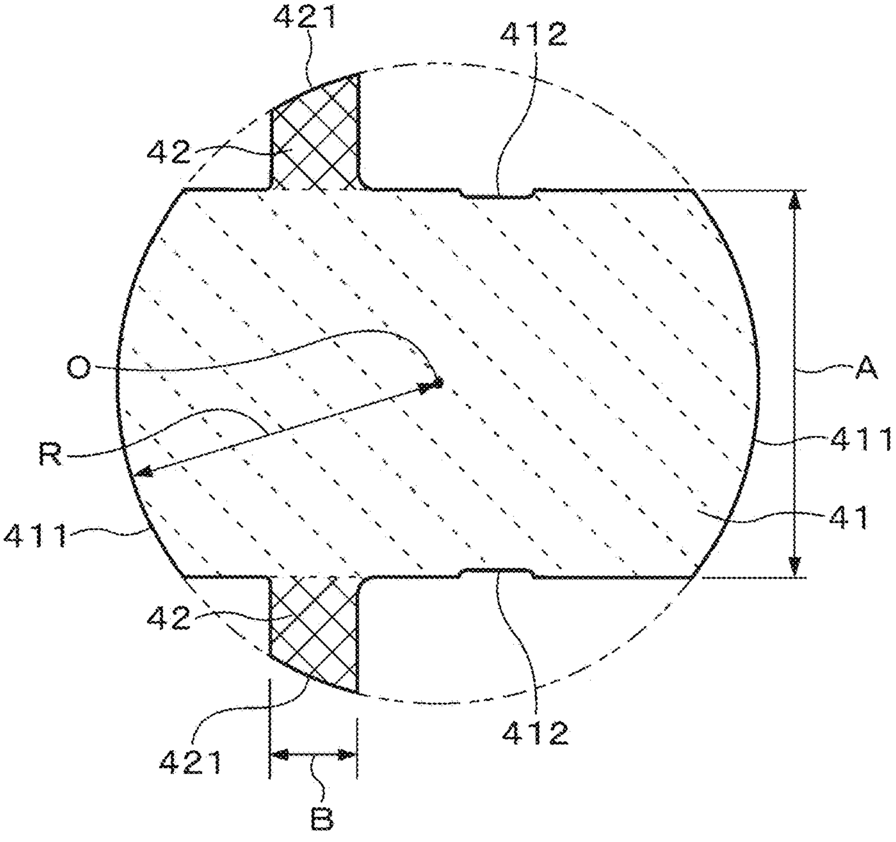
FIG. 8 is a view showing an example of an electrode plate in an example of the capacitive liquid sensor according to one embodiment.

The first electrode plate 401 and the second electrode plate 402 are formed in the same shape. As shown in FIGS. 6 to 8, the electrode plate 40 includes a detection portion 41 and two fixing portions 42. In FIG. 8, the detection portion 41 is a region indicated by dashed diagonal lines, and the fixing portion 42 is a region indicated by solid shaded lines. The detection portion 41 occupies a large portion of the electrode plate 40 and is a portion facing another electrode plate 40 that is adjacent. In other words, the detection portions 41 are regions in the adjacent first electrode plate 401 and second electrode plates 402 that overlap with each other. The detection portion 41 is formed, for example, in a rectangular or substantially rectangular shape that is long in the direction in which the two frames 30 are arranged.

The fixing portion 42 is a portion extending from each edge of the detection portion 41, that is, each end of the long side portion. The fixing portion 42 extends in a direction orthogonal to the longitudinal direction of the detection portion 41. In the case of the present embodiment, the fixing portions 42 are regions in the adjacent first electrode plates 401 and second electrode plates 402 that do not overlap with each other. The fixing portion 42 is provided not at the end of the detection portion 41 in the longitudinal direction, but in the middle in the longitudinal direction. The fixing portion 42 is provided at a position shifted to one side from a longitudinal center O of the detection portion 41.

The electrode plate 40 is formed in a cross shape where the longitudinal direction of the detection portion 41 intersects the protruding direction of the fixing portion 42. In the electrode plate 40, an outer edge 411 of the detection portion 41 and an outer edge 421 of the fixing portion 42 are formed from arcs of the same circle, that is, in the form of arcs having the same radius. The electrode plate 40 is formed integrally with the detection portion 41 and the fixing portion 42 by, for example, punching a circular thin plate through press working or the like.

Here, it is assumed that the outer edge 411 of the detection portion 41 and the outer edge 421 of the fixing portion 42 are formed by arcs of a circle with a radius R centered at the center O. The center O is the center of the detection portion 41 in the longitudinal direction and the width direction. In this case, a dimension A in the width direction of the detection portion 41 is set to a value greater than the radius R, and a dimension B in the width direction of the fixing portion 42 is set to a value smaller than the radius R. The width dimension A of the detection portion 41 is preferably within a range of 1.2 to 1.3 times the radius R, and the width dimension B of the fixing portion 42 is preferably within a range of ¼ to ⅓ of the radius R.

The detection portion 41 includes a relief portion 412. The relief portion 412 is provided on each long side of the detection portion 41, and is formed in the shape of a depression or notch in a part of this long side. The relief portion 412 has a function of preventing contact between the electrode plate 40 and the frame 30 to which the electrode plate 40 is not connected. In other words, as shown in FIG. 6, the relief portion 412 of the first electrode plate 401 has a function of preventing contact with the second frame 302. As shown in FIG. 7, the relief portion 412 of the second electrode plate 402 has a function of preventing contact with the first frame 301.

When each electrode plate 40 is attached to the frame 30, the region of the detection portion 41 in the electrode plate 40, which is closer to the center O side than the fixing portion 42, is passed through the through-portion 31 from the protruding portion 32 side of the frame 30. The electrode plate 40 is connected and fixed to the frame 30 by, for example, projection welding, spot welding, or seam welding at the portion where the fixing portion 42 of the electrode plate 40 and the frame 30 come into contact with each other. Thus, the fixing portion 42 is welded and fixed to the frame 30. Note that the electrode plate 40 may be connected and fixed to the frame 30 by a means such as brazing. The fixing portion 42 of the electrode plate 40 and the frame 30 may be provided with a projection and a recess for positioning, for example.

Figure 9:
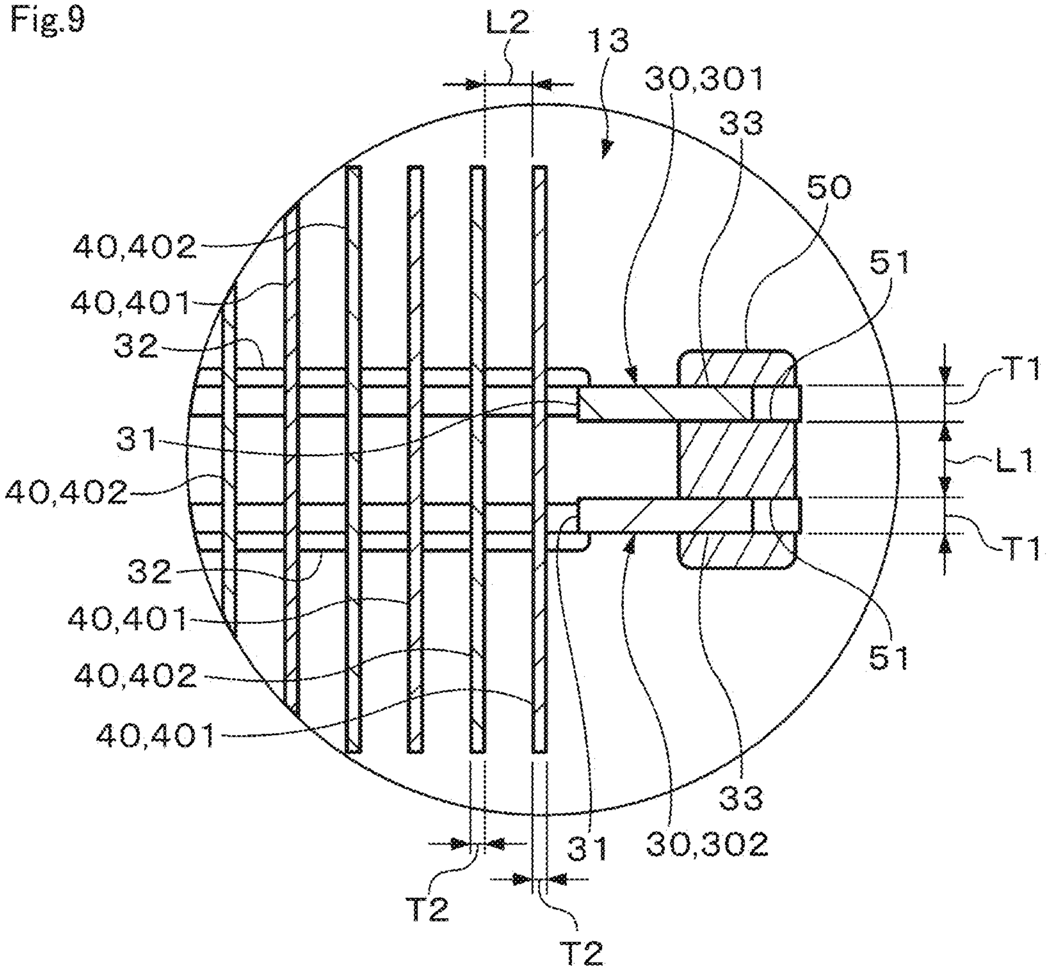
FIG. 9 is an enlarged view of the portion indicated by X9 in FIG. 4 in an example of the capacitive liquid sensor according to one embodiment.

As shown in FIGS. 1, 3, 4, and 9, the first electrode plates 401 and the second electrode plates 402 are alternately arranged at equal intervals. Also, as shown in FIG. 9, a distance L1 between the first frame 301 and the second frame 302 is set to a value greater than a distance L2 between the adjacent first electrode plate 401 and second electrode plate 402. In other words, the distance L2 between the adjacent first electrode plate 401 and second electrode plate 402, that is, between the surfaces thereof, is set to a value smaller than the distance L1 between the first frame 301 and the second frame 302, that is, between the surfaces thereof. A thickness dimension T1 of each of the first frame 301 and the second frame 302 is set to be larger than a thickness dimension T2 of each of the first electrode plates 401 and the second electrode plates 402. In this case, the distance between the centers of the first electrode plate 401 and the second electrode plate 402, in consideration of the thicknesses thereof, is L2+T2.

When the liquid sensor 10 detects, for example, refrigeration oil, refrigerant, and the like present in the compressor as detection targets, the distance L2 between the adjacent first electrode plate 401 and second electrode plate 402 is preferably set within a range of, for example, 1 mm to 1.8 mm. Thus, the capacitance required for liquid detection can be obtained, and liquid drainage between the electrode plates 401, 402 can be improved. The distance L1 between the frames 301, 302 is preferably set within a range of, for example, 2 mm to 3 mm. This suppresses retention of droplets and bubbles, discharged from the electrode plates 401, 402 toward the frame 30, between the two frames 30 due to the effect of surface tension and the like. This results in better liquid drainage in the detection unit 13, enabling improvement in the responsiveness of the liquid sensor 10.

Each electrode plate 40 is fixed to one of the two frames 30, and is passed through the through-portion 31 of the other frame 30 in a manner that each electrode plate 40 does not contact the other frame 30 and the electrode plate 40 fixed to the other frame 30. In other words, the first electrode plate 401 is fixed to the first frame 301, and is passed through the through-portion 31 of the second frame 302 in a manner that the first electrode plate 401 does not contact the second frame 302 and the second electrode plate 402. Similarly, the second electrode plate 402 is fixed to the second frame 302, and is passed through the through-portion 31 of the first frame 301 in a manner that the second electrode plate 402 does not contact the first frame 301 and the first electrode plate 401.

The number of first electrode plates 401 and the number of second electrode plates 402 may be the same or different. In the case of the present embodiment, the number of first electrode plates 401 is set to be greater by one than the number of second electrode plates 402. For example, in the case of the present embodiment, as shown in FIG. 2, the number of first electrode plates 401 is set to six, while the number of second electrode plates 402 is set to five. The first electrode plates 401 are disposed at both end portions of the array of the first electrode plates 401 and the second electrode plates 402.

Figure 10:
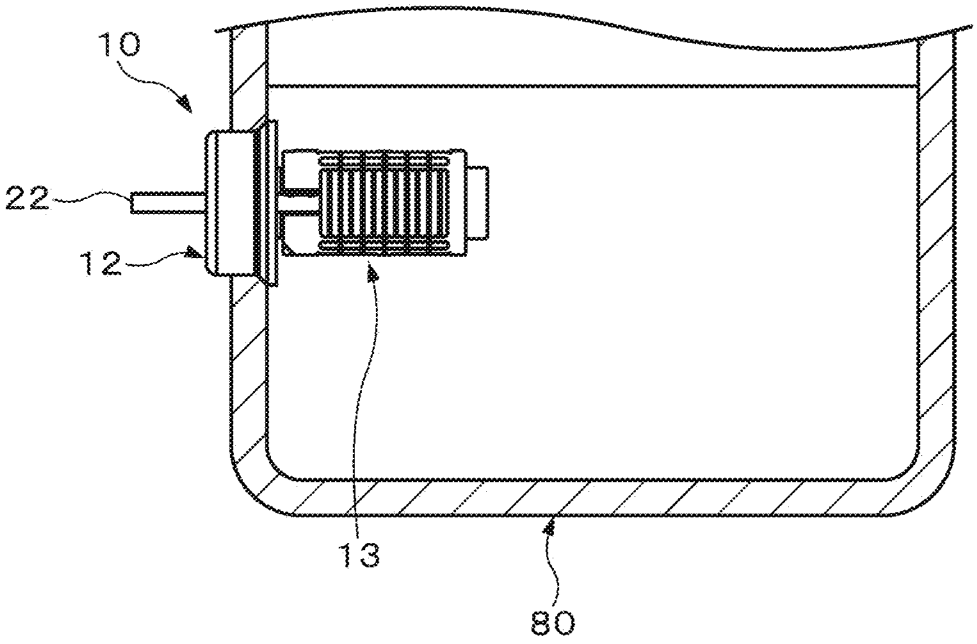
FIG. 10 is a view showing a first use example of the capacitive liquid sensor according to one embodiment.
Figure 11:
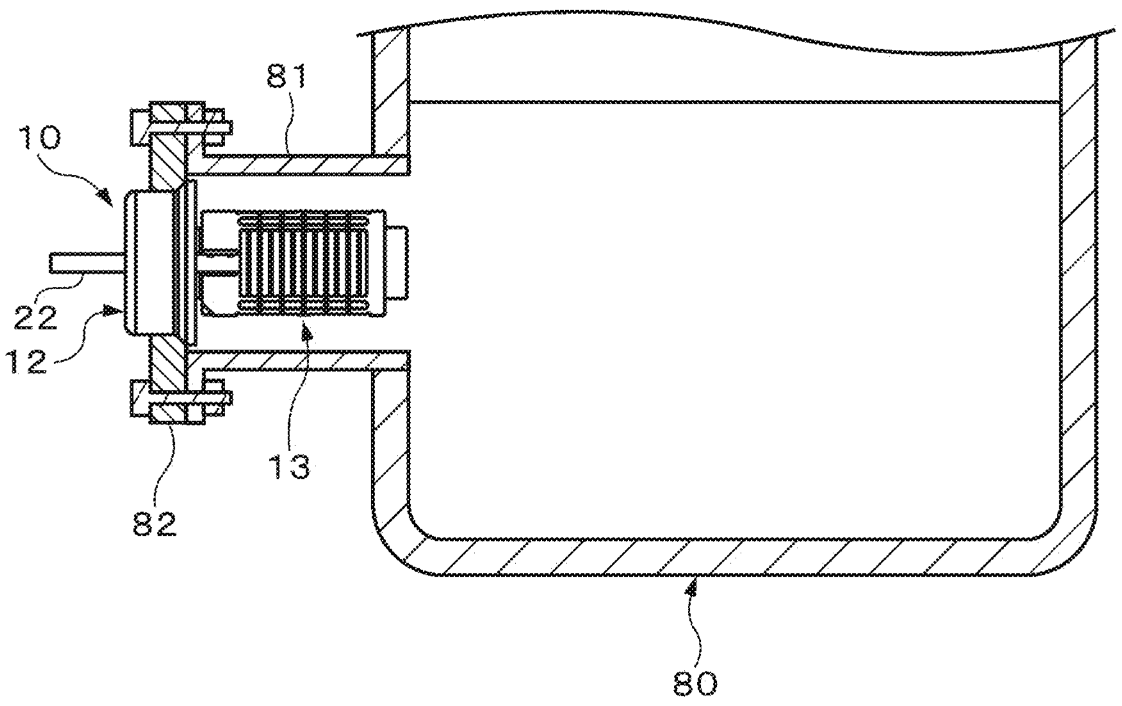
FIG. 11 is a view showing a second use example of the capacitive liquid sensor according to one embodiment.

Next, with reference to FIGS. 10 and 11, an example of installing the liquid sensor 10 in an installation target will be described. With a container 80 of the compressor as the installation target, the liquid sensor 10 is used by being installed in the container 80. In the example of FIG. 10, the liquid sensor 10 is directly installed in the peripheral wall of the container 80. In the example of FIG. 11, the liquid sensor 10 is installed in a flange 81 of the container 80. The flange 81 is provided on the peripheral wall of the container 80 and is formed in a cylindrical shape protruding outward from the peripheral wall of the container 80. In the example of FIG. 11, the liquid sensor 10 is installed in the flange 81 via the flange lid 82.

When the liquid sensor 10 is installed in the container 80, an operator installs the liquid sensor 10 in the container 80 in an orientation in which the surfaces of the first frame 301 and the second frame 302 face the vertical direction, and the surfaces of the first electrode plate 401 and the second electrode plate 402 face the vertical direction. In other words, the operator installs the liquid sensor 10 in the container 80 in an orientation in which arrow D in FIG. 1 is vertical. In this case, the two frames 301, 302 are arranged in the horizontal direction, and the gap between the two frames 301, 302 is open in the vertical direction. The two conductive terminal pins 221, 222 are arranged in the horizontal direction. When the operator installs the liquid sensor 10 in the container 80, the operator can adjust the orientation of the liquid sensor 10 so that the two conductive terminal pins 221, 222 are arranged horizontally, for example, while observing the arrangement of the two conductive terminal pins 221, 222.

A signal processing circuit (not shown) is connected to the portion of the conductive terminal pins 22 exposed outside the container 80, for example, via an electric wire (not shown) or directly. The signal processing circuit determines the state of the liquid based on the change in the capacitance of the detection unit 13, and outputs a signal corresponding to the state. The signal output from the signal processing circuit is then transmitted to, for example, the controller of the compressor in which the liquid sensor 10 is installed, and the controller controls the operation of the compressor according to the state of the liquid based on the signal output from the signal processing circuit.

According to the embodiment described above, the liquid sensor 10 includes the base member 21, the first conductive terminal pin 221, the second conductive terminal pin 222, the first frame 301, the second frame 302, the plurality of first electrode plates 401, and the plurality of second electrode plates 402. The first conductive terminal pin 221 and the second conductive terminal pin 222 are passed through the base member 21 and fixed to the base member 21 via the electrically insulating filler 23. The first conductive terminal pin 221 and the second conductive terminal pin 222 are electrically insulated from each other.

The first frame 301 is made of a metallic material and is electrically connected to the first conductive terminal pin 221. The second frame 302 is made of a metallic material and is electrically connected to the second conductive terminal pin 222. The plurality of first electrode plates 401 are each made of a metal plate and are connected and fixed to the first frame 301. The plurality of second electrode plates 402 are each made of a metal plate and are connected and fixed to the second frame 302. In other words, each first electrode plate 401 and each second electrode plate 402 are electrically connected and physically fixed to the first frame 301 and the second frame 302, respectively, by welding, brazing, or the like.

The first frame 301 and the second frame 302 include through-portions 31, respectively, through which the first electrode plate 401 and the second electrode plate 402 are passed, and are arranged to face each other. The first electrode plate 401 and the second electrode plate 402 each include the detection portion 41 and two fixing portions 42 extending from both edges of the detection portion 41. The first electrode plate 401 and the second electrode plate 402 are each formed in a cross shape where the longitudinal direction of the detection portion 41 intersects the protruding direction of the fixing portion 42. The first frame 301 and the second frame 302 are arranged alternately to face each other.

In the first electrode plate 401, the fixing portion 42 of the first electrode plate 401 is fixed to the first frame 301 in a state where the detection portion 41 of the first electrode plate 401 is passed through the through-portions 31 of the first frame 301 and the second frame 302. In the second electrode plate 402, the fixing portion 42 of the second electrode plate 402 is fixed to the second frame 302 in a state where the detection portion 41 of the second electrode plate 402 is passed through the through-portions 31 of the second frame 302 and the first frame 301. In this case, the respective fixing portions 42 of the first electrode plate 401 and the second electrode plate 402 are connected and fixed to the edges around the through-portions 31 of the first frame 301 and the second frame 302, specifically, to the edges extending in the longitudinal direction of the first frame 301 and the second frame, by welding, brazing, or the like.

Thus, providing a plurality of electrode plates 40 can increase the capacitance of the liquid sensor 10, resulting in an increase in the sensitivity of the liquid sensor 10. Each electrode plate 40 is connected and fixed to the frame 30 by the two fixing portions 42 that extend not from the longitudinal ends of the detection portion 41 but from both edges of the detection portion 41, so as to form a cross shape with respect to the detection portion 41. Therefore, compared to a case where each electrode plate 40 is supported at the longitudinal end of the detection portion 41, the distance from the fixing portion to the end of the electrode plate 40 can be shortened, and as a result, the effect of bending due to external force can be reduced. This can suppress a change in the distance between the electrode plates 40, resulting in stable performance of the liquid sensor 10.

Moreover, since the fixing portion 42 extends outward from both edge sides of the detection portion 41, tools and the like are unlikely to interfere with the detection portion 41 during welding work for fixing the fixing portion 42 to the frame 30, so that reliable work can be performed with a simple device.

Further, a method for installing the liquid sensor 10 of the present embodiment in the container 80 includes a step of installing the liquid sensor 10 in the installation target such as the container 80 in an orientation in which the surface direction of each of the two frames 30 is the vertical direction and the surface direction of the detection portion 41 of each electrode plate 40 is the vertical direction.

By installing the liquid sensor 10 of the present embodiment in the container 80 or the like as described above, the position of the liquid surface in the container 80 changes, and when the detection unit 13 moves from liquid to gas, or when the detection unit 13 moves from gas to liquid, the liquid between the electrode plates 40 can flow in a direction along the surfaces of the electrode plates 40 due to the effect of the flow of liquid around the detection unit 13, gravity, and the like. Thus, the droplets and bubbles adhering to the electrode plates 40 can be easily discharged from between the electrode plates 40. As a result, the liquid sensor 10 capable of accurately detecting a change in liquid surface can be provided.

Moreover, each electrode plate 40 is fixed to the frame 30 in a state where the detection portion 41 is passed through the through-portion 31 of the frame 30. In other words, a part of the detection portion 41 is surrounded by the frame 30. When the liquid sensor 10 is installed in the installation target such as the container 80 in an orientation in which the surface direction of each of the two frames 30 is the vertical direction and the surface direction of the detection portion 41 of each electrode plate 40 is the vertical direction, there is a contact portion between the fixing portion 42 of the electrode plate 40 and the frame 30 in the lower part of the electrode plate 40 in the gravitational direction. Thus, when the detection unit 13 is exposed from liquid, the droplets and bubbles adhering to the electrode plate 40 collect in the lower part of the electrode plate 40 in the weight direction across the surface of the electrode plate 40, and then flow through the contact portion between the fixing portion 42 and the frame 30 to the frame 30. Therefore, the droplets and bubbles adhering to the electrode plates 40 can be quickly discharged from between the electrode plates 40, and as a result, the detection accuracy and response speed of the liquid sensor 10 can be further improved.

In the electrode plate 40, the outer edge 411 of the detection portion 41 and the outer edge 421 of the fixing portion 42 are formed from some of the arcs of the same circle, in this case, arcs having the radius R. In other words, the outer periphery of the electrode plate 40 is formed from some of the arcs having the same radius R. Thus, in a case where the detection unit 13 is disposed in a cylindrical space, or in other cases, large areas of the detection portion 41 and the fixing portion 42 can be ensured within the contour of the cylindrical space. By ensuring a large area of the detection portion 41, a large capacitance can be obtained. By ensuring a large area of the fixing portion 42, the rigidity of the fixing portion 42 can be improved to suppress a change in the distance between the electrode plates 40. As a result, the performance of the liquid sensor 10 can be further improved according to the present embodiment.

As shown in FIG. 9, the distance L1 between the first frame 301 and the second frame 302 is larger than the distance L2 between the adjacent first electrode plate 401 and second electrode plate 402. This can suppress retention of the liquid, which has moved from between the first electrode plates 401 and the second electrode plates 402 toward the frame 30, in the gap between the two frames 30 due to the effect of surface tension and the like. Therefore, the accumulation of droplets and bubbles between the frame 30 and the electrode plates 40 is suppressed more effectively. As a result, the liquid sensor 10 can quickly detect a change in the liquid surface, and the responsiveness can be further improved.

The thickness dimension T1 of each of the first frame 301 and the second frame 302 is set larger than the thickness dimension T2 of each of the first electrode plate 401 and the second electrode plate 402. This can make the first frame 301 and the second frame 302 thicker and more rigid than the first electrode plate 401 and the second electrode plate 402. Thus, even when the plurality of electrode plates 40 are closely arrayed, the frame 30 is restrained from bending due to the weight or the like of each electrode plate 40, and each electrode plate 40 can be held reliably. This can suppress a change in the position of the electrode plate 40 due to deformation or the like of the frame 30, resulting in further improvement in the sensitivity and reliability of the liquid sensor 10.

Among the electrode plates 40, the number of electrode plates 401 connected and fixed to one frame 301 is set to be greater by one than the number of electrode plates 402 connected and fixed to the other frame 302, and the electrode plates 401, the number of which is set to be greater by one, are disposed at both end portions of the array of the electrode plates 40. In other words, among the electrode plates 40, the number of electrode plates 401 constituting one pole is set to be greater by one than the number of electrode plates 402 constituting the other pole. Then, the electrode plates 401 of the same pole are disposed at both end sides of the alternate array of the electrode plates 40 in the longitudinal direction. In the case of the present embodiment, the number of first electrode plates 401 is set to be greater by one than the number of second electrode plates 402, and the first electrode plates 401 are disposed at both end portions of the array of the first electrode plates 401 and the second electrode plates 402.

Thus, when the detection unit 13 is constructed by a combination of the first frame 301 to which the first electrode plates 401 are fixed and the second frame 302 to which the second electrode plates 402 are fixed, it is possible to reduce variations in characteristics due to a shift in the positional relationship with respect to the longitudinal direction of the detection unit 13, that is, the array direction of the electrode plates 40. In other words, in the case of looking at the combination of the opposing surfaces of the first electrode plate 401 and the second electrode plates 402, by arranging electrode plates of the same pole at both ends, the number of combinations in which the opposing surfaces move closer to each other, that is, the capacitance increases, can be matched with the number of combinations in which the opposing surfaces move away from each other, that is, the capacitance decreases.

Figure 12:
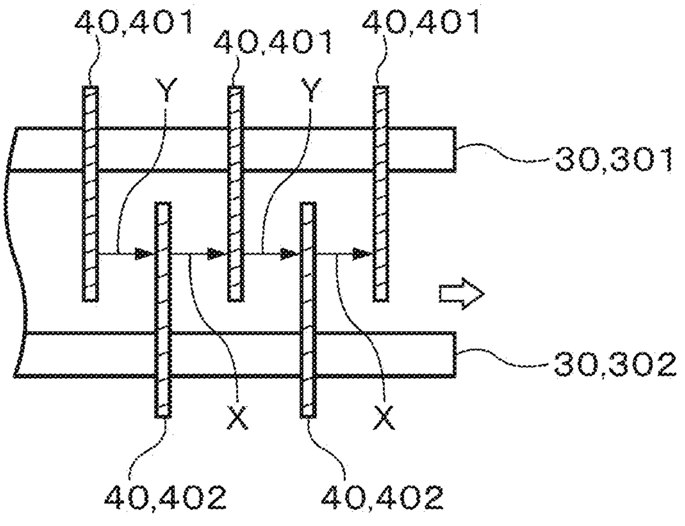
FIG. 12 is a view conceptually showing a positional relationship between first electrode plates and second electrode plates in the capacitive liquid sensor according to one embodiment.

For example, as shown in FIG. 12, when the second frame 302 provided with the second electrode plates 402 shifts from the first frame 301 provided with the first electrode plates 401 in the direction indicated by the white arrow, that is, to the right of the figure, the distance indicated by arrow X decreases and the distance indicated by arrow Y increases. In this case, among the adjacent electrode plates 401, 402, the capacitance between surfaces separated by a distance indicated by arrow X increases, and the capacitance between surfaces separated by a distance indicated by arrow Y decreases.

Here, in a configuration where the first electrode plate 401 and the second electrode plate 402 are arranged alternately, if the number of first electrode plates 401 and the number of second electrode plates 402 are equal, the first electrode plate 401 will be disposed at one end and the second electrode plate 402 will be disposed at the other end. In this case, the number of arrows X and the number of arrows Y indicated in FIG. 12 will be different. Then, if a shift occurs in the positional relationship between the first frame 301 provided with the first electrode plates 401 and the second frame 302 provided with the second electrode plates 402, the total capacitance of the detection unit 13 as a whole will also change.

In contrast, if the electrode plates 40 of the same pole are disposed at both ends, the number of arrows X and the number of arrows Y will be equal, and the amount of change in the total capacitance of the detection unit 13 as a whole will be smaller. Therefore, according to the present embodiment, even if a shift occurs in the positional relationship, that is, in the distance or inclination, with respect to the array direction of the electrode plates 40, a change in the total capacitance of the detection unit 13 as a whole can be suppressed. As a result, according to the present embodiment, it is possible to reduce variations in characteristics due to a positional shift or the like at the time of assembly.

Modifications

Note that the distance L1 between the two frames 30, the distance L2 between the electrode plates 40, and the number and size of the electrode plates 40 are not limited to those described above, and can be appropriately adjusted according to the nature of the liquid to be detected, the required sensitivity, and the like.

Although the above example shows the metal plate processed as the connecting member 11 that connects the conductive terminal pin 22 to the frame 30, when the detection unit 13 is fixed using a member different from the connecting member 11, the connecting member 11 may be made of a flexible conductor or a member that deforms plastically, for example.

The liquid sensor 10 of the present embodiment is not limited to the detection of the liquid surface heights of lubricating oil and liquid refrigerant, which is performed by placing the detection unit 13 near the gas-liquid interface inside the compressor. For example, the detection unit 13 can be disposed in gas or liquid at all times and used for detecting a phenomenon that causes a change in dielectric constant between the electrode plates 40, such as detecting the mixing ratio between lubricating oil and liquid refrigerant.

The airtight terminal 12 and the detection unit 13 may be configured to be detachable. For example, when the space in which the liquid sensor 10 can be installed is limited, it may be preferable to attach the airtight terminal 12 to the wall surface of the container in advance and then attach the detection unit 13. In such a case, the airtight terminal 12 and the detection unit 13 may be configured to be detachable, that is, the conductive terminal pin 22 and the frame 30 may be configured to be detachable.

One embodiment described above has been presented as an example and is not intended to limit the scope of the invention. This novel embodiment can be implemented in various other forms, and various omissions, substitutions, and changes can be made without departing from the gist of the invention. The present embodiment and variations thereof are included in the scope and gist of the invention, and are also included in the invention recited in the claims and the equivalents thereof.

The invention claimed is:

1. A capacitive liquid sensor comprising:

a base member;

a first conductive terminal pin and a second conductive terminal pin that are passed through the base member, are fixed to the base member via a filler having electrical insulation, and are electrically insulated from each other;

a first frame that is made of a metallic material and electrically connected to the first conductive terminal pin;

a second frame that is made of a metallic material and electrically connected to the second conductive terminal pin;

a plurality of first electrode plates that are each made of a metal plate and are connected and fixed to the first frame; and a plurality of second electrode plates that are each made of a metal plate and are connected and fixed to the second frame, wherein the first frame and the second frame include through-portions, respectively, through which the first electrode plates and the second electrode plates are passed, and are arranged to face each other, the first electrode plates and the second electrode plates each include a detection portion and two fixing portions extending from both edges of the detection portion, are each formed in a cross shape in which a longitudinal direction of the detection portion intersects a protruding direction of the fixing portions, and are arranged alternately to face each other, in each of the first electrode plates, the fixing portion of the first electrode plate is fixed to the first frame in a state where the detection portion of the first electrode plate is passed through the through-portions of the first frame and the second frame, and in each of the second electrode plates, the fixing portion of the second electrode plate is fixed to the second frame in a state where the detection portion of the second electrode plate is passed through the through-portions of the second frame and the first frame.

2. The capacitive liquid sensor according to claim 1, wherein, in each of the first electrode plate and the second electrode plate, an outer edge of the detection portion and an outer edge of each of the fixing portions are formed from arcs of the same circle.

3. The capacitive liquid sensor according to claim 1, wherein a distance between the first frame and the second frame is larger than a distance between the first electrode plate and the second electrode plate adjacent to each other.

4. The capacitive liquid sensor according to claim 1, wherein a thickness dimension of each of the first frame and the second frame is set larger than a thickness dimension of each of the first electrode plate and the second electrode plate.

5. The capacitive liquid sensor according to claim 1, wherein, among the first electrode plates and the second electrode plates, the number of electrode plates connected and fixed to one frame is set to be greater by one than the number of electrode plates connected and fixed to the other frame, and the electrode plates, the number of which is set to be greater by one, are disposed at both end portions of array of the first electrode plates and the second electrode plates.

6. A method for installing the capacitive liquid sensor according to claim 1 to an installation target, the method comprising:

a step of installing the capacitive liquid sensor in the installation target in an orientation in which a surface direction of each of the first frame and the second frame is a vertical direction and a surface direction of each of the first electrode plates and the second electrode plates is the vertical direction.

* * * * *